INVENTORS.
Robert D. Blue
George B. Cobel

BY Griswold & Burdick
ATTORNEYS

May 9, 1961  R. D. BLUE ET AL  2,983,600
PURIFYING TITANIUM SPONGE

Filed Oct. 23, 1957  2 Sheets-Sheet 2

INVENTORS.
Robert D. Blue
George B. Cobel

BY Griswold & Burdick
ATTORNEYS

United States Patent Office 2,983,600
Patented May 9, 1961

2,983,600
PURIFYING TITANIUM SPONGE

Robert D. Blue and George B. Cobel, Midland, Mich., assignors to The Dow Chemical Company, Midland, Mich., a corporation of Delaware Filed Oct. 23, 1957, Ser. No. 691,918

3 Claims. (Cl. 75—84.5)

The invention relates to the purification of group IV, subgroup a, metals referred to hereinafter as subgroup IVa metals. More particularly it relates to the purification of such metals prepared in an unrefined state by the action of a reducing metal on a subgroup IVa metal halide wherein the metal is produced as a sponge which is contaminated with entrained reducing metal and the halides of the reducing metal by subgroup IVa metals as used herein are meant the four metals: titanium, zirconium, hafnium, and thorium as commonly so grouped in the periodic table of elements as, for example, at page 134 of Van Nostrand's Scientific Encyclopedia (1938), at page 120 of Mellor's Modern Inorganic Chemistry, abridged edition (1952), at page 44 of H. Remy Treatise on Inorganic Chemistry, vol. 1 (1956) or page 79 of College Chemistry by Linus Pauling (1957).

Subgroup IVa metal sponge, contaminated with entrained halides and reducing metal, must be purified before it can be used. The purification method usually employed is either vacuum distillation or leaching with an aqueous solution. In vacuum distillation the entrained contaminants are slowly volatilized off by subjecting the subgroup IVa metal sponge to a temperature of from about 850° to 950° C. under a vacuum and thereafter cooling it in a protective atmosphere or in a vacuum. The time consumption and cost of this operation are high. The resulting sponge is highly porous and thereafter must be compacted, for example by melting, requiring further precautions against contamination by air during the compacting. Furthermore, subgroup IVa metal sponge purified by vacuum distillation still contains objectionable quantities of halides and reducing metal after treatment.

If purification is effected by leaching, the titanium or other subgroup IVa metal sponge is fragmented and subjected to the action of an aqueous acid solution, e.g., dilute aqueous HCl, which leaches out a portion of the entrained contaminants. One objection to the leaching method is that it is accompanied by the absorption of hydrogen by the metal being treated, forming a compound of hydrogen which seriously impairs the desirable properties of the metal. Another objection is that sponge subjected to leaching, similar to that purified by vacuum distillation, still contains an objectionable quantity of residual halides which is too large for a number of specific commercial uses.

A need, therefore, exists for an improved method of and means for removing entrained halide salts and reducing metal from subgroup IVa metal sponge.

It has been proposed to purify subgroup IVa metal sponge by passing it up an inclined tube in an atmosphere of inert gas while heating it at a temperature of between 1,000° and 1,700° C. However, titanium sponge, prepared by reducing titanium chloride, by magnesium, which was thus purified still analyzed 0.08 percent chlorine by weight, which is objectionably high for a number of specific industrial uses.

An object of the invention is to provide a method of and means for purifying subgroup IVa metal sponge which result in a metal having a lower halide content than is provided by known methods and which do not entail time-consuming vacuum distillation procedure. A future object is to provide a method of and means for purifying subgroup IVa metal sponge which do not cause an appreciable increase in the hydrogen content of the sponge.

The manner and means by which these and other objects of the invention are accomplished will be made clear by the following description and the annexed drawing and is particularly defined in the appended claims.

Broadly the invention comprises heating a subgroup IVa metal sponge in an inert gas atmosphere at a temperature above the boiling point of both the reducing metal and the halides of the reducing metal and below the melting point of the subgroup IVa metal, cooling the thus-treated metal, and thereafter leaching the cooled metal with water or an aqueous solution. The aqueous solution may contain hydrogen or hydroxyl ions in sufficient amount to give a pH value of between 3 and 9 and may contain up to 300 parts per million of minerals normally found to some degree in tap water, e.g., soluble carbonates, bicarbonates, sulfates, oxides, and halides.

Although the invention is applicable to the purification of any subgroup IVa metal, for convenience the following description is directed towards the purification of titanium sponge.

Figure 1 of the drawing is an elevational view, largely in section, of an apparatus of the invention.

Figure 2 diagrammatically shows successive positions of the crucible of Figure 1 which contains a subgroup IVa metal to be purified employing the apparatus of Figure 1.

Figure 1:
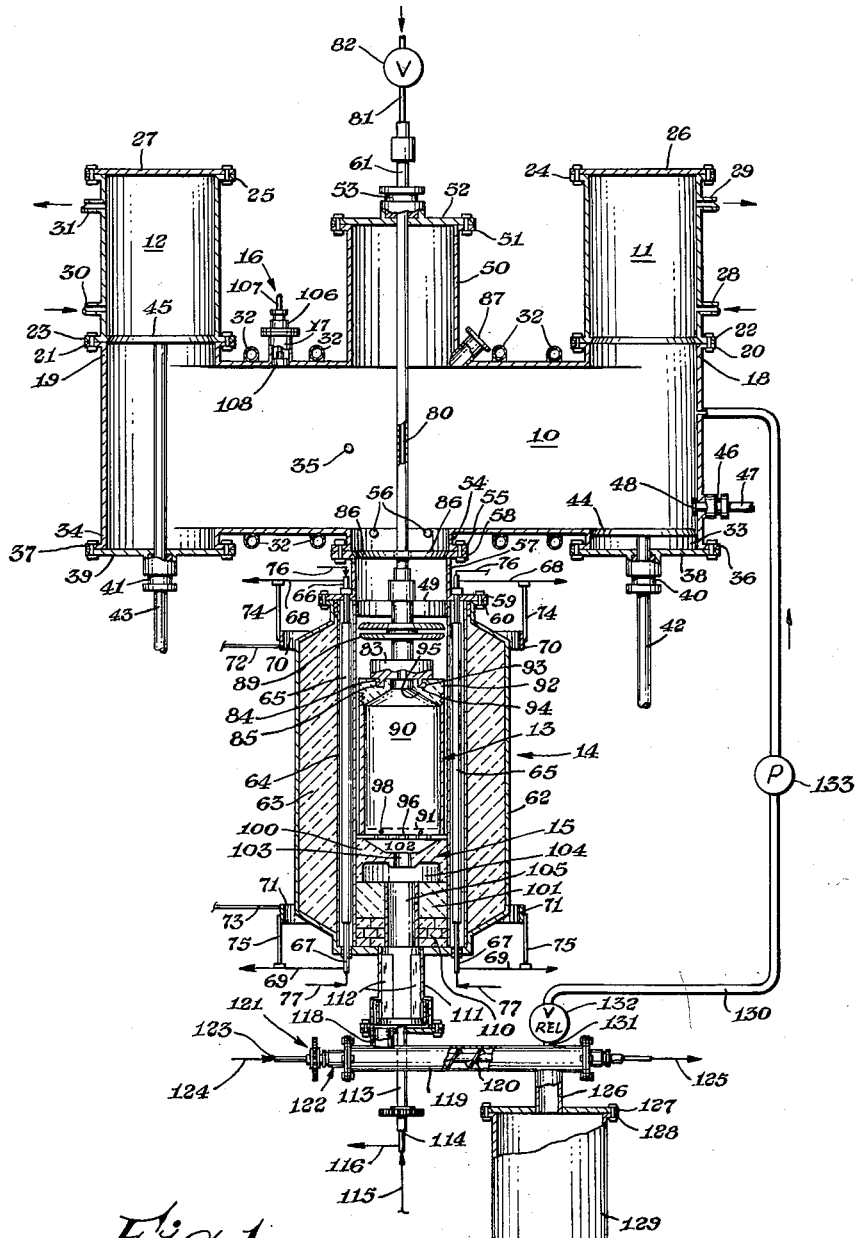

The apparatus illustrated by Figure 1 comprises transfer chamber 10 together with entry chamber 11 and exit chamber 12, for admitting and removing crucible 13 containing the subgroup IVa metal being purified, heating chamber 14 positioned subjacent to transfer chamber 10 and containing hearth 15 onto which crucible 13 is lowered, and a collection means positioned below heating chamber 14 for collecting impurities removed from the metal in crucible 13.

Referring to the drawing in greater detail there are shown collars 18 and 19 extending upwardly from the top of transfer chamber 10 near the ends thereof. Flanges 20 and 21 are integrally formed about the open tops of collars 18 and 19, respectively, to which are secured flanges 22 and 23, respectively, which are formed about the open bottoms of entry chamber 11 and exit chamber 12, respectively. The inner periphery of each pair of adjacent flanges, 20 and 22 and 21 and 23, is tapered inwardly toward the entry and exit chambers to provide valve seats therein. The entry and exit chambers have flanged tops 24 and 25 to which are affixed removable covers 26 and 27. Inert gas inlet 28 and gas outlet 29 are located in entry chamber 11 and inert gas inlet 30 and gas outlet 31 are located in exit chamber 12.

Figure 2:
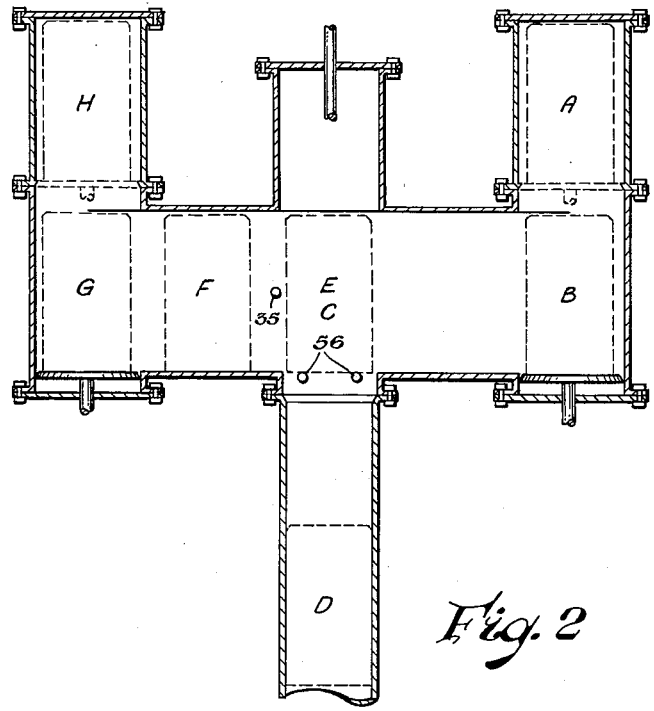

Opening into transfer chamber 10 at the top thereof is shown inert gas inlet 16 comprising flanged collar 17, flanged connector 106, flexible gas line 107 passing through 106, and slideable insert ring 108 for sealably attaching 107 to a crucible for admission of an inert gas therein when positioned therebelow in chamber 10 as indicated by position F of Figure 2. Cooling coils 32 on the top and bottom of transfer chamber 10 provide temperature control for 10. Located in the bottom of transfer chamber 10 in openings provided therefor and in opposing relationship to entry chamber 11 and exit chamber 12 are wells 33 and 34, respectively. About the open bottom of wells 33 and 34 are flanges 36 and 37, respectively, to which are affixed bottom closing plates 38 and 39, respectively. Located centrally in bottom plates 38 and 39 are openings into which are inserted stuffing boxes 40 and 41, respectively.

Passing through stuffing boxes 40 and 41, respectively, are slideable vertical rods 42 and 43, upon the upper ends of which are flat disk-like horizontal valves 44 and 45, respectively, which have inwardly and upwardly tapered or beveled edges which mate with the correspondingly tapered internal periphery of the flanges located at the bottom openings of the entry and exit chambers to form valve seats and thereby make sealing engagement therewith when rods 42 and 43 are advanced upwardly. In Figure 1, valve 45 is shown advanced into sealing engagement with its valve seat and valve 44 is shown fully retracted into well 33.

Extending upwardly from the top of transfer chamber 10 about midway between the entry and the exit chambers is cylindrical housing 50 having flanged top 51 and cover 52 thereon. Cover 52 has a central hole therein into which is inserted stuffing box 53 through which passes lifting rod 61 for raising and lowering a crucible to and from heating chamber 14. Rod 61 contains central channel 80. Flexible inert gas line 81 having valve 82 therein is connected to rod 61 to admit inert gas into channel 80.

In the side of transfer chamber 10 below entry chamber 11 in a hole provided therefor is stuffing box 46 through which is slideable pushrod 47 having pusher head 48 on the end thereof which operates within chamber 10. Horizontal guide pin 35 is retractably positioned across chamber 10 to serve as a stop when advancing crucible 13 from position B to position C of Figure 2.

In the bottom of transfer chamber 10, aligned with housing 50 and of approximately the same diameter, is tubular connector 54 having flanged lower end 55 which opens into a second flanged tubular connector 57. Inserted in openings in opposing sides of connector 54 and slideably positioned horizontally thereacross at a level flush with the floor of transfer chamber 10 are fingers 56.

Flange 58 at the upper end of connector 57 is secured to flange 55 at the lower end of connector 54. Connector 57 has flange 59 about its lower end which is secured to flange 60 at the upper end of the heating chamber, indicated generally by numeral 14.

Heating chamber 14 comprises cylindrical steel shell 62 containing pulverized insulation 63. Defining the inward extension of insulation 63 and arranged in a generally circular pattern, and in contact with each other, is a plurality of vertical graphite tubes 64 which pass through equally spaced holes in a circular pattern in annular supporting ring 49. Centrally positioned but spacially removed from the inner wall of each of tubes 64 are graphite heating elements 65.

Inserted in the top of elements 65 are copper nipples 66 and in the bottom of elements 65 are nipples 67. Electrically conducting pipes 68 leading from nipples 66 make electrical contact between each of nipples 66 and electrical cables 74 which in turn are connected to bus bar 70. Electrically conducting pipes 69 leading from nipples 67 make electrical contact between each of nipples 67 and electrical cables 75 which in turn are connected to bus bar 71. Bus bars 70 and 71 are connected to oppositely charged electric lead-in lines 72 and 73, respectively, which lead from a source of D.C. or A.C. (not shown).

Figure 3:
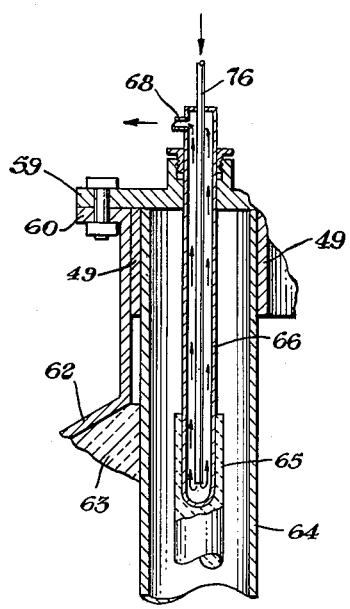
Figure 3 is an enlarged fragmentary elevation, partly in section, of the upper portion of a heating element of Figure 1.

Pipes 76 and 77 are shown entering nipples 66 and 67, respectively, for the admission of cooling water from a source (not shown) to elements 65. Pipes 68 leading from nipples 66 and pipes 69 leading from nipples 67, in addition to conducting electricity, also provide drain lines for cooling water which passes centrally into nipples 66 and 67 through pipes 76 and 77, respectively and emerges at the open ends thereof into the annular space between the inner walls of 66 and the outer walls of pipes 76 at the top or the inner walls of 67 and the outer walls of 77 at the bottom of elements 65. A return means for the cooling water is thus provided by the annular channels between the outer walls of the pipes and the inner walls of the nipples. By reference to Figure 3 (an enlarged fragmentary view of the upper portion of a heating element assembly), the electrical means for heating and the cooling means provided therefor will be made more clear.

Horizontal baffle 89 is shown firmly secured to rod 61, and, directly therebelow, lifting head assembly 83 is shown rotatably affixed to the lower end of rod 61. 83 comprises fixed downwardly projecting annulus 84 having outwardly extending feet 85 on the lower face.

Horizontal disk-like valve 86 having an upwardly and inwardly tapered periphery is slideably supported by rod 61 which passes centrally through a hole in the valve as shown. The hole is of somewhat greater diameter than that of rod 61. When rod 61 is completely lowered as shown, valve 86 rests in the valve seat formed by the mated tapered inner periphery of flange 55 of connector 54 and flange 58 of connector 57.

Figure 4:
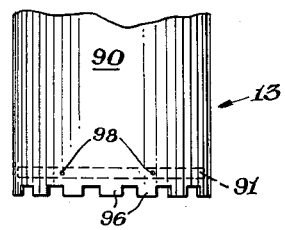
Figure 4 is an enlarged fragmentary elevation of the lower part of the crucible of Figure 1.

Graphite crucible 13 consists of cylindriform body member 90 and perforated circular flat bottom plate 91 inserted therein and held positively in position by removable graphite pins 98 a short distance from the bottom edge thereof as shown in Figure 4. Body member 90 has a bottle-like neck 95 with a central opening therein for admission of inert gas. The lower edge of body member 90 is notched to provide downwardly extending projections 96 which serve as spacers as shown in Figure 4 so that gases may pass out beneath bottom plate 91.

Integrally affixed to neck 95 of body member 90 is locking head assembly 92 having annular groove 93 therein which is undercut outwardly and has vertical slots 94 cut vertically down the outer rim of the groove to receive feet 85 of projecting annulus 84 of head assembly 83 for locking crucible 13 thereto.

Crucible 13, when heating, is supported by graphite hearth 15 consisting of upper member 100 and base 101. Upper member 100 contains dish-shaped depression 102 in the top surface thereof which forms a continuous passageway with the interior of crucible 13. In the bottom of depression 102 is a central opening which leads downwardly into cylindrical throat 103. Throat 103 terminates in enlarged doughnut-shaped annular cavity 104. Leading downwardly from 104 and running centrally through base 101 of the hearth is tube 105 of somewhat greater diameter than throat 103. Base 101 rests on insulating bricks 110 which have a central opening therein through which tube 105 extends.

Integrally attached to tube 105 at its lower end is receiving tube 111 of somewhat larger diameter than tube 105 and having revolving scraper blades 112 therein turned by water-cooled shaft 113 which has axial cooling channel 114 therein. Water is supplied to channel 114 by line 115 and leaves through line 116. Leading downwardly from the bottom of receiving tube 111 is outlet tube 118 which opens into horizontal barrel 119 in which conveyor screw 120 is rotatably positioned. Screw 120 is turned by gear and shaft assembly 121; shaft 121 is inserted through stuffing box 122. Shaft 121 has an axial channel 123 therethrough into which water from supply line 124 is admitted and is removed through drain line 125.

Near the end of barrel 119 is droptube 126 having flanged bottom end 127. Secured to flanged bottom end 127 is flange 128 of receptacle 129 for receiving impurities.

Inert gas line 130 is shown leading from gas outlet 131, located in the top of barrel 119 opposite to droptube 126, into transfer chamber 10 through an opening provided therefor. Valve 132 in line 130 is a means for controlling the release of the gas and therefore the pressure in the system. Gas is circulated by means of gas blower 133.

Figure 1 shows crucible 13 in heating chamber 14 or position D of Figure 2. It may be considered to contain titanium already purified according to step one of the invention and therefore ready to be removed. The steps in the removal of the crucible will be described more fully hereinafter.

The practice of the invention employing the apparatus shown in the drawing will be described for a fresh charge of raw titanium to be purified. The crucible shown in Figure 1 will be considered removed, valve 44 advanced into the valve seat formed by flanges 20 and 22, rod 61 retracted, i.e., raised so that lifting head assembly 83 is in housing 50, fingers 56 retracted, and valve 45 lowered into well 34.

Cover 26 is removed from flange 24 and crucible 13, charged with titanium sponge, placed on valve 44 in position A of Figure 2. Cover 26 is replaced and entry chamber 11 is then exhausted through gas outlet 29 and inert gas is admitted through inlet 28. Lines 28 and 29 are then closed off by valves (not shown). Valve 44 is lowered until it is seated in well 33 so that crucible 13 is in position B of Figure 2. Pusher 48 is then advanced to contact crucible 13 and thereafter continued to advance horizontally until the crucible contacts guide pin 35 which positions it over fingers 56 and directly below lifting head assembly 83 in housing 50, placing the crucible in position C of Figure 2.

Lifting head assembly 83 on rod 61 is then lowered so that feet 85 slide down slots 94, annulus 84 thereby being made to fit into groove 93 of locking assembly 92. By turning the lifting head assembly about a quarter of a turn, feet 85 are securely engaged in the undercut portion of groove 95 thereby engaging locking assembly 92 of crucible 13.

Inert gas is admitted through inlet gas line 81 by opening valve 82 therein and is passed down channel 80 in rod 61. Water is started circulating through the various cooling means, viz., cooling coils 32 of chamber 10, tubes 76 and 77 in nipples 66 and 67 in resistor elements 65, through channel 114 in scraper shaft 113, and through channel 123 in shaft 121 of screw 120. Valve 132 in line 130 is opened and blower 133 started to prevent back pressure in the system. Fingers 56 are withdrawn and crucible 13 is lowered by means of rod 61 onto upper member 100 of hearth 15 to the position shown in Figure 1 which is also position D of Figure 2.

An electrical potential is set up in resistors 65 by connecting lead-in lines 72 and 73 which lead to opposite terminals of a source of electrical power to heat chamber 14. The temperature in crucible 13 is raised by the heat thus produced to between 1500° and 1690° C.

Impurities consisting chiefly of magnesium chloride and magnesium metal liquefy and volatilize and are swept down through perforated crucible bottom plate 91 and on down into throat 103 and tubes 105 and 111 by the inert gas passing down channel 80. Inert gas entering chamber 10 and passing down through the clearance between valve 86 and rod 61 produces positive pressure around crucible 13 which prevents the volatilized impurities from passing up into transfer chamber 10. There is also thus produced a movement of inert gas inwardly through the notches in the lower edge of 90 provided by projections 96 and thence into depression 102 of hearth member 100.

Doughnut-shaped annular cavity 104 forms a cooling pocket around the impurities passing downwardly therethrough and lessen the conductivity of heat downwardly into and through hearth base 101. Tube 105, being slightly larger than throat 103, permits the cooling impurities now largely solidified to drop into tube 111 without excessive accumulation along the sides. The impurities by now substantially solidified, fall to the bottom of receiving tube 111 and are scraped by scraper blades 112 into the opening in the bottom thereof leading to outlet 118. The material, now in the form of a powder, drops into horizontal barrel 119 and is carried along by screw 120 to the opening in the bottom of barrel 119 leading to droptube 126 through which the dry impurities fall and accumulate in receptacle 129.

After heating crucible 13 for from 3 to 10 hours, the electrical circuit through resistor elements 65 is broken. Rod 61 is raised, thereby raising disk 86 together with lifting head and locking assemblies 83 and 92 and crucible 13 until disk 86 and the lifting head and locking assemblies are retracted into housing 50, and crucible 13 is above the bottom of chamber 10. Fingers 56 are then advanced to support crucible 13, head assembly 83 is disengaged from locking assembly 92 on the crucible by turning rod 61 about a quarter turn to bring feet 85 in line with slots 94, and the crucible, thereby released, is made to rest on fingers 56. This is position E of Figure 2 which is the same as the preceding position C.

Pin 35 is withdrawn and pusher head 48 is advanced until it presses against the side of crucible 13 and pushes it to a position immediately below gas inlet 16 where it is locked by inserting annular ring 108 into the opening in neck 95 of crucible 13. The crucible is now in position F of Figure 2. Inert gas is then admitted through 16 thus cooling the titanium in crucible 13. Due to the openings in plate 91 of the crucible, gas circulates freely therethrough. After crucible 13 has cooled sufficiently to render the titanium therein substantially unreactive with the atmosphere, it is disengaged from 108 and pushed by means of pusher 48 onto valve 45, i.e., position G of Figure 2. Valve 45 is then raised until it seats in the valve seat formed by the tapered edges of flanges 21 and 23 thereby placing crucible 13 in exit chamber 12, position H of Figure 2. Cover 27 is removed and crucible 13 lifted out. Body member 90 of the crucible is then separated from bottom plate 91 by retracting graphite pins 98 and the titanium thus purified according to step one is removed.

Cover 27 is replaced and exit chamber 12 is then flushed by admitting inert gas into inlet line 30 and exhausting it through outlet 31. Valve 45 may then be lowered into well 34 ready for receiving the next crucible containing partially purified titanium.

The titanium thus treated is now ready to be subjected to step two of the method of the invention. It is subdivided to a particle size which is less than 40 millimeters but greater than 0.25 millimeter but preferably between 20 millimeters and 0.3 millimeter. The particulated titanium is placed in a container or chamber preferably an elongated vertical one containing water or an aqueous solution having a pH between 3 and 9 where it is subjected to the leaching effect of the water or aqueous solution. A container provided with an inlet and an outlet for a continuous flow of water therethrough is preferred. The water enters the inlet, passes through the chamber, preferably in a serpentine or indirect path as one provided by baffles in the container and thence out through the outlet. The water is preferably introduced near or at the bottom of a vertical elongated container and drawn off near or at the top. A flow of water commonly employed is one between 5 and 10 gallons per minute per square foot of cross-section of the container.

After between about 2 and 24 hours of treatment in the aqueous solution the titanium is removed and dried. The length of time of the aqueous treatment is best determined by periodic analysis of the water or aqueous solution for residual chlorine. The results from individual runs may thereafter serve as a guide to the time required for similar sponge previously heated according to step one of the invention. From 4 to 8 hours are usually employed for step two.

Titanium thus purified according to the invention shows a lower chlorine content by analysis than titanium purified by any other method known to the inventors.

The following example is illustrative of one mode of practicing the invention:

A charge of 2,500 pounds of titanium sponge, prepared by reducing titanium tetrachloride by magnesium according to U.S. Patent 2,564,337 to Maddex, was placed in a crucible of the type described for use in the apparatus shown in the drawing and placed in the heating chamber as shown in Figure 1, i.e., position D of Figure 2, according to the procedure of step one described hereinbefore. Three and one-half hours were taken to raise the temperature of the titanium to 1590° C. It was held at that temperature for seven hours. It was then cooled and removed according to the procedure described hereinabove for step one. A sample of the titanium was analyzed for chlorine and found to contain 0.38 percent.

1,000 grams of the thus-treated titanium were fragmented to a size that substantially all of the fragments had their greatest dimension between 12.0 millimeters and 0.3 millimeter.

The fragmented titanium was then placed in a chamber having an inlet for a liquid near the bottom attached to a water supply and an outlet near the top as described above. The water was adjusted to a pH value of between 6 and 7 by adding hydrochloric acid. The substantially neutral water was then circulated through the mass of fragmented titanium in the chamber at the rate of 7 gallons per minute per square foot of cross-section of the container until a total of 8 liters had passed through the mass of fragmented titanium.

The titanium thus treated was removed from the chamber and dried. It was analyzed for chlorides and found to contain 0.04 percent of the chlorine component.

Eight additional charges of contaminated titanium similar to that used in Example 1 were partially purified of contaminants by passing them successively through the apparatus of the type shown in Figure 1. After removing the titanium charges from the apparatus according to the procedure described above, a Brinell hardness number was determined for each. The charges were thereafter leached according to step two of the invention. The average results of the Brinell hardness values before leaching was 26 above that of the average Brinell hardness number after leaching.

The results of the Brinell hardness tests show that a definite reduction in hardness and therefore of brittleness results from the practice of the invention.

For certain specific methods of alloying and using subgroup IVa metals, e.g., zirconium and titanium, the chlorine content cannot be appreciably above 0.04 percent. The improvement made possible by the practice of the invention, although not a large value when expressed mathematically, is of inestimable value in the industry because it makes possible such methods as $\beta$-ray melting in the alloying of zirconium and titanium which is not possible when chlorine is present in slightly higher percentages.

The practice of the invention lends itself well to the employment of a plurality of crucibles simultaneously in step one. For example, one crucible containing raw metal to be purified may be placed in position A while another is being heated in position D, another cooling in position F and still another ready to be removed in position H.

Having described the invention, what is claimed and desired to be protected by Letters Patent is:

1. The method of treating a contaminated subgroup IVa metal selected from the class consisting of titanium and zirconium and containing reducing metal and halide salt impurities which comprises the steps of: heating the contaminated metal in a closed system at a temperature above the boiling point of both the reducing metal and the halide salt but below the melting point of the subgroup IVa metal for at least 3 hours to liquefy and volatilize the impurities while directing the flow of inert gas downwardly through the system to sweep out and carry away the liquefied and volatilized impurities from the subgroup IVa metal being heated; continuously removing the impurities thus liquefied and volatilized from the vicinity of the metal being so heated; cooling the subgroup IVa metal thus heated in an atmosphere comprising an inert gas; fragmenting the thus cooled metal; subjecting the fragmented metal to the leaching action of an aqueous liquid to carry away in solution substantially all remaining impurities; and drying the thus-treated subgroup IVa metal.

2. The method of removing entrained contaminating reducing metal and halide salt from a subgroup IVa metal selected from the class consisting of titanium and zirconium which was prepared by the reaction of a reducing metal with a halide of the metal sought to be produced comprising: charging the so-produced contaminated metal in a crucible having an opening substantially at the top and perforations in the bottom thereof; heating the thus-charged crucible at a temperature above the boiling point of the contaminating reducing metal and halide salt but below the melting point of the contaminated subgroup IVa metal in an atmosphere of an inert gas while passing inert gas downwardly through said crucible to sweep out the volatilized and liquefied impurities therefrom; cooling the thus-treated subgroup IVa metal in the crucible while passing inert gas therethrough; solidifying the impurities thus removed; fragmenting the thus-purified subgroup IVa metal to a particle size of between 40 and 0.3 millimeter; placing the thus-fragmented subgroup IVa metal in a vessel containing an aqueous solution having a pH value of between 3 and 9 for at least two hours to dissolve from said subgroup IVa metal substantially all impurities remaining therein; and waterwashing and drying the thus-purified metal.

3. The method of producing high-purity titanium metal, having a halogen content not substantially greater than 0.04 percent by weight from a low-purity fragmented titanium metal, made by reacting a magnesium metal with titanium tetrahalide and containing magnesium metal and halide contaminants, which comprises: placing the fragmented low-purity titanium in a crucible having an opening at the top and openings at the bottom of less size than the fragments of titanium metal; placing the crucible and contents in an inert gas atmosphere; subjecting the crucible and its contents to a temperature between about 1500° and 1600° C. to volatilize and liquefy the contaminants while passing an inert gas downwardly through and around the crucible to flush down said contaminants; solidifying and removing said contaminants; cooling the thus-treated titanium in an atmosphere of inert gas; fragmenting the thus-treated titanium particles to a size such that the greatest dimensions are between 40 millimeters and 0.25 millimeter; placing the thus-fragmented titanium in a flow of water at a flow rate of between 0.5 and 30 gallons per minute per square foot of cross-section of said flow for a period of at least 2 hours to leach out and carry away substantially all the remaining contaminants; and drying the thus-treated titanium metal.

References Cited in the file of this patent

UNITED STATES PATENTS

| | | |
|---|---|---|
| 2,663,634 | Stoddard et al. | Dec. 22, 1953 |
| 2,740,709 | Herres et al. | Apr. 3, 1956 |
| 2,778,726 | Winter et al. | Jan. 22, 1957 |
| 2,787,539 | Conklin | Apr. 2, 1957 |
| 2,796,644 | Kuhn | June 25, 1957 |
| 2,816,828 | Benedict et al. | Dec. 17, 1957 |
| 2,828,199 | Findlay | Mar. 25, 1958 |